United States Patent
K et al.

(10) Patent No.: US 11,381,564 B2
(45) Date of Patent: Jul. 5, 2022

(54) RESOURCE SECURITY INTEGRATION PLATFORM

(71) Applicant: SAP SE, Walldorf (DE)

(72) Inventors: Srinath K, Bangalore (IN); Sahana M D, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/067,457

(22) Filed: Oct. 9, 2020

(65) Prior Publication Data

US 2022/0116393 A1   Apr. 14, 2022

(51) Int. Cl.
H04L 9/40 (2022.01)

(52) U.S. Cl.
CPC .......... H04L 63/10 (2013.01); H04L 63/08 (2013.01)

(58) Field of Classification Search
CPC ......... H04L 63/08; H04L 67/02; H04L 67/10; H04L 41/28; H04L 67/42; H04L 63/0281; H04L 67/28; H04L 67/32; H04L 63/20; H04L 63/205; H04L 67/2804; H04L 63/10; H04L 63/0884
See application file for complete search history.

(56) References Cited

U.S. PATENT DOCUMENTS

| | | | |
|---|---|---|---|
| 9,098,346 B2 * | 8/2015 | Robb | G06F 9/5072 |
| 10,628,244 B1 | 4/2020 | Cseri et al. | |
| 10,924,482 B1 * | 2/2021 | Roth | G06F 21/6218 |
| 2012/0110603 A1 * | 5/2012 | Kaneko | G06F 9/547 |
| | | | 719/328 |
| 2014/0089383 A1 * | 3/2014 | Hong | G06F 9/54 |
| | | | 709/203 |
| 2016/0092297 A1 * | 3/2016 | Mazon | G06F 11/0793 |
| | | | 714/15 |
| 2016/0301739 A1 * | 10/2016 | Thompson | G06F 9/547 |
| 2016/0352867 A1 * | 12/2016 | Subbarayan | H04L 63/08 |
| 2017/0149790 A1 * | 5/2017 | Yamamoto | G06F 21/44 |
| 2018/0096128 A1 * | 4/2018 | Hiramatsu | G06F 21/43 |
| 2020/0220875 A1 * | 7/2020 | Harguindeguy | H04L 63/0281 |
| 2020/0351243 A1 * | 11/2020 | Lu | H04L 63/105 |
| 2021/0357522 A1 * | 11/2021 | Hopkins | G06F 16/148 |

OTHER PUBLICATIONS

European Extended Search Report for EP Appl # 21201419.5, dated Feb. 28, 2022, 8 pages.

* cited by examiner

*Primary Examiner* — David R Lazaro
(74) *Attorney, Agent, or Firm* — Fountainhead Law Group P.C.

(57) ABSTRACT

A resource security integration platform may be configured to establish API integration between software applications and various APIs. The security platform may be configured to register for authorization with multiple APIs in order to communicate with those API such that so that the source applications do not need to authenticate or communicate with the API themselves. A source request is received from a source system including an indication of a resource and an address of an application programming interface of a destination system. A definition of the application programming interface is determined based on the address. Authorization for accessing the destination system is obtained using the definition. Then an interface request message is generated and sent it to the destination system using the authorization. The interface response message is received from the destination system and response data based on the interface response message is sent to the source system.

20 Claims, 5 Drawing Sheets

FIG. 4

RESOURCE SECURITY INTEGRATION PLATFORM

BACKGROUND

The present disclosure pertains to data requests from a source system to a destination system, and in particular to integration of application programming interface (API) requests in a secure platform.

In many cases, software applications interact with each other in order to perform efficient data processing without duplicating code and effort. There are several integration techniques available for establishing communication between separate applications. For example, application programming interfaces (APIs) may be used by developers of software applications to leverage the capabilities of other applications using request and response messaging. Accessing an API may require a software developer to determine input parameters for the APIs such as the Uniform Resource Locator (URL), the authentication mechanism, the Hypertext Transfer Protocol (HTTP) method used, the content type, the request body requirements, and other parameters. Input parameter information may be required for each different API, which may be provided by different destination systems or service providers. In addition, each service provider may use different authorization mechanisms and require registration with an authorization server. Accordingly, it may be difficult and time consuming to design a software application that accesses various APIs.

The present disclosure addresses these issue and others, as further described below.

SUMMARY

One embodiment provides a computer security system comprising one or more processors and one or more machine-readable medium. The one or more machine-readable medium being coupled to the one or more processors and storing computer program code comprising sets of instructions executable by the one or more processors. The instructions executable to receive, from a source system, a source request including an indication of a resource and an address of an application programming interface of a destination system. The instructions being further executable to obtain a definition of the application programming interface based on the address. The instructions being further executable to obtain authorization for accessing the destination system using the definition of the application programming interface. The instructions being further executable to generate an interface request message based on the indication of the resource, the address, and the definition of the application programming interface. The instructions being further executable to send the interface request message to the destination system using the authorization. The instructions being further executable to receive an interface response message from the destination system. The instructions being further executable to send response data based on the interface response message to the source system.

Another embodiment provides one or more non-transitory computer-readable medium storing computer program code comprising sets of instructions. The computer program code comprising instructions to receive, from a source system, a source request including an indication of a resource and an address of an application programming interface of a destination system. The computer program code further comprising instructions to obtain a definition of the application programming interface based on the address. The computer program code further comprising instructions to obtain authorization for accessing the destination system using the definition of the application programming interface. The computer program code further comprising instructions to generate an interface request message based on the indication of the resource, the address, and the definition of the application programming interface. The computer program code further comprising instructions to send the interface request message to the destination system using the authorization. The computer program code further comprising instructions to receive an interface response message from the destination system. The computer program code further comprising instructions to send response data based on the interface response message to the source system Another embodiment provides a computer-implemented method. The method includes receiving, from a source system, a source request including an indication of a resource and an address of an application programming interface of a destination system. The method further includes obtaining a definition of the application programming interface based on the address. The method further includes obtaining authorization for accessing the destination system using the definition of the application programming interface. The method further includes generating an interface request message based on the indication of the resource, the address, and the definition of the application programming interface. The method further includes sending the interface request message to the destination system using the authorization. The method further includes receiving an interface response message from the destination system. The method further includes sending response data based on the interface response message to the source system.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

As mentioned above, application programming interfaces (APIs) may be used by developers of software applications to leverage the capabilities of other applications using request and response messaging. Accessing an API may require software developers to determine the input parameters for the API such as the Uniform Resource Locator (URL), the authentication mechanism, the Hypertext Transfer Protocol (HTTP) methods, the content type, the request body requirements, and so on. Such information may be required for each different API provided by various destination systems or service providers. In addition, each service provide may use different authorization mechanisms and require registration with an authorization server. Accordingly, it may be difficult and time consuming to design a software application that accesses various APIs.

The present disclosure provides a resource security integration platform (referred to as a "security platform") to address the issues above and others. The security platform may be configured to establish API integration between software applications and various APIs. The security platform may be configured to register for authorization with multiple APIs in order to communicate with those API such that so that the source applications do not need to authenticate or communicate with the API themselves. Features and advantages of the security platform include enabling source applications to authenticate with the single security platform instead of authenticating with numerous API platforms individually. Furthermore, the security platform reduces API integration complexity by being configured to receive simplified metadata information from source applications and use that metadata information generate complex API requests for the destination systems based on API definition information. Features and advantages of the security platform further include enabling software developers to design simple metadata requests for use with the security platform instead of generating complete API request messages. The security platform further provides scanning and monitoring of API requests to prevent revealing sensitive data, business/personal contact details, and other private information. Further details of the security platform are described below.

Figure 1:
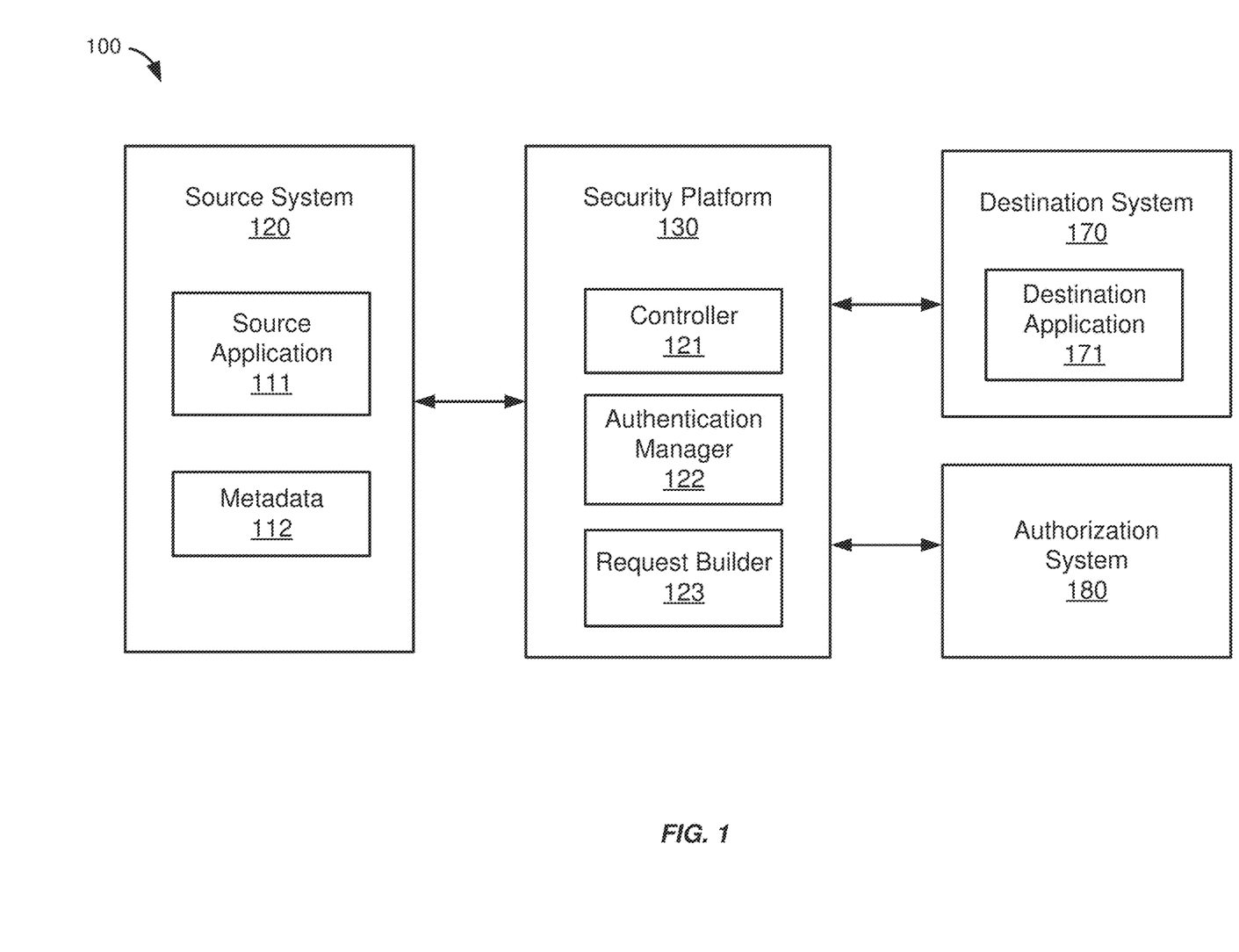
FIG. 1 shows a diagram of a security platform in communication with a source system and a destination system, according to an embodiment.

FIG. 1 shows a diagram 100 of a security platform 130 in communication with a source system 120 and a destination system 170, according to an embodiment. The security platform 130 may also be in communication with an authorization system 180. The security platform 130 may communicate with the source system 120, the destination system 170, and the authorization system 180 over one or more communication networks (e.g., the Internet).

The source system 120 includes a source application 111 that is designed to consume resources obtained from a destination application 171 of the destination system 170. The source application refers to an application that accesses the target API of the destination system 170 using the security platform 130. The source system 120 may be a computer device or a system of one or more computer devices. For example, the source system may be a desktop computer, a laptop computer, a smartphone, a tablet, a wearable device, or other computing device.

The security platform 130 may be configured to handle authorization for accessing the destination system 170 and the generation of the API request made to the destination system 170. As such, the source system 120 may not need to be configured to perform the API requests and authorization itself. Furthermore, the source system 120 may not need to generate a complete API request including all information required as input parameters for the API. Instead, the source system 120 may generate simplified metadata 112 for the API request. The metadata 112 may include a name or indication of the resource being requested, a URL of a destination application 171, an authorization type for the API (e.g., none, access token, SAML, or JWT), any additional headers for the API request, the method (e.g., GET, POST, PUT, DELETE, or PATCH), and any data or hooks used. The source system 120 may be a computer device or a system of one or more computer devices. For example, the source system may include one or more server computers.

The security platform 130 includes a controller 121 configured to read the metadata file 112 provided by the source system 120. The controller 121 may be configured to initiate an authentication manager 122 to establish a connection with a target API at the destination system 170 (e.g., an API of destination application 171). The controller 121 may be configured to trigger a request builder 123 to build request header/payload. The controller 121 may send the request to the destination system 170 (e.g., a target API of the destination application 171). The request may be through a security tunnel provided by the security platform 130, as further described below.

The destination system 170 may be configured to provide access to its destination application 171 based on the API. The destination system 170 may also provide a definition of the API that may be accessed by the security platform 130 and other computing devices. The destination system 170 may be a computer device or a system of one or more computer devices. For example, the source system may include one or more server computers.

The authorization system 180 may provide access to the destination system 170 based on registration and authentication with the authorization system 180. In some embodiments, the destination system 170 may handle authorization instead. The security platform 130 may register with the authorization system 180 and perform authentication with the authorization system 180 instead of the source system. The authorization system 180 may be a computer device or a system of one or more computer devices. For example, the source system may include one or more server computers.

The features and advantages of the security platform are further described below.

Figure 2:
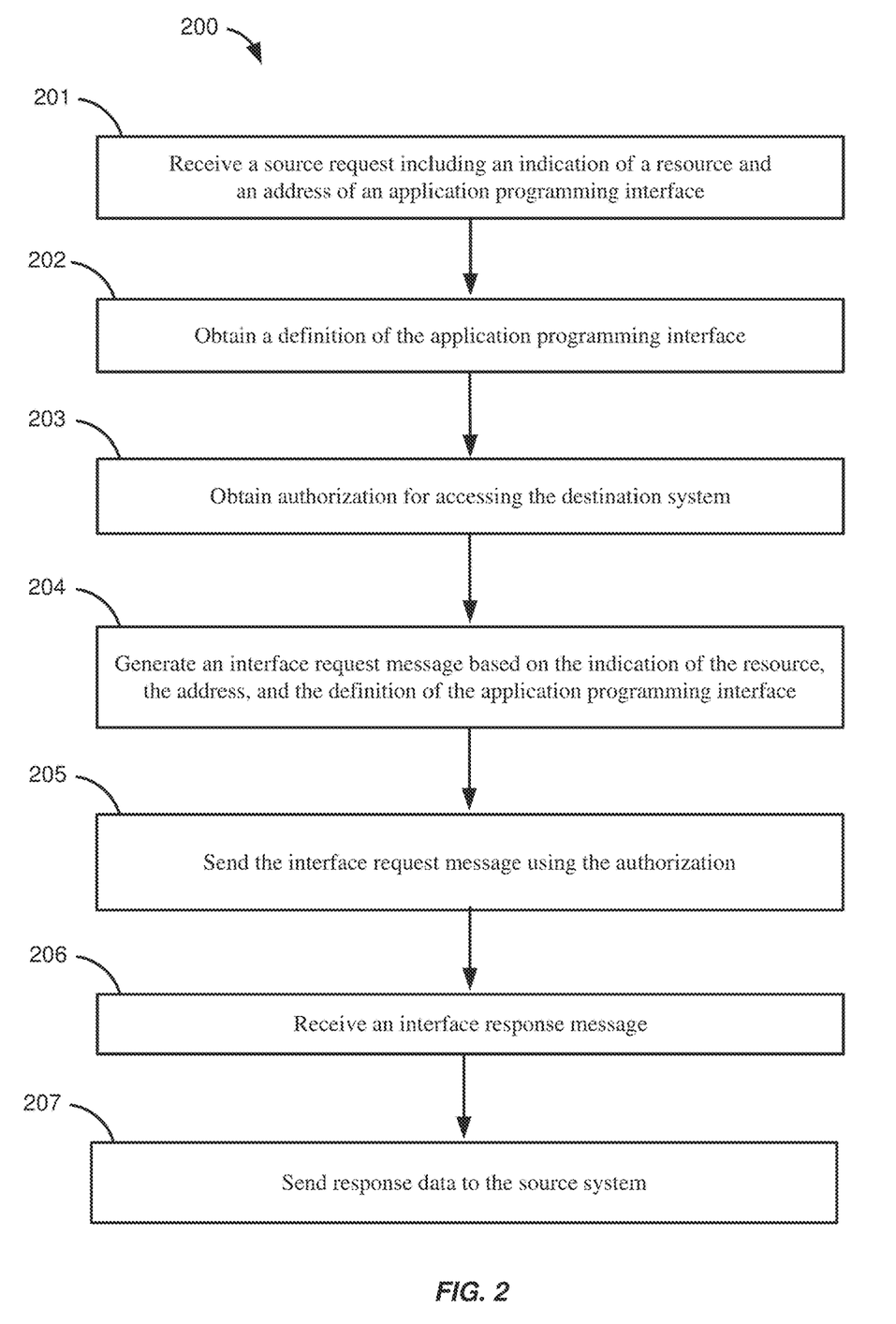
FIG. 2 shows a flowchart of a computer security method, according to an embodiment.

FIG. 2 shows a flowchart 200 of a computer security method, according to an embodiment. The computer security method may be performed by the resource security integration platform described here. The steps of the computer security method may be performed in a different order than described, unless noted otherwise.

At 201, the computer security method may receive, from a source system, a source request including an indication of a resource and an address of an application programming interface of a destination system. The destination system may provide the resource using the application programming interface. The address maybe a URL of the destination system. The indication of the resource may be a name or identifier of the particular API resource. The source request may be formatted using JavaScript Object Notation (JSON) for example.

At 202, the computer security method may obtain a definition of the application programming interface based on the address. The definition information may be formatted as a swagger file. The definition of the API may indicate the API method, content type, format, payload template, and header information, for example.

At 203, the computer security method may obtain authorization for accessing the destination system using the definition of the application programming interface. The authorization may be an access token, for example.

At 204, the computer security method may generate an interface request message based on the indication of the resource, the address, and the definition of the application programming interface. The request message may be a complete API request message meeting the requirements of the destination system's API.

At 205, the computer security method may send the interface request message to the destination system using the authorization. The authorization may be based on "oAuth" or "base64" authentication, for example.

At 206, the computer security method may receive an interface response message from the destination system. The response message may include information generated or obtained by the destination system in response to the request message.

At 207, the computer security method may send response data based on the interface response message to the source system. As such, the source system may access an API provided by the destination system without directly communicating with the destination system.

In some embodiments, the computer security method may send a second interface request message based on the first interface response message, thereby chaining the interface requests together. In such embodiments, the indication of the resource may be a first indication of a first resource, and the address of the application programming interface of the destination system may be a first address of a first application programming interface of a first destination system.

In such embodiments, the source request further includes a second indication of a second resource and a second address of a second application programming interface. And the interface response message from the destination system may a first interface response message. The computer security method may further generate a second interface request message based on the first interface response message, the second indication of the second resource, and the second address. The computer security method may further obtain a second interface response message based on the second interface request message. The response data sent to the source system may be further based on the second interface response message. As such, the interface responses have been chained together.

In some embodiments, the computer security method may scan the interface request message based on one or more security policies.

In some embodiments, the computer security method may send an access request to an authorization server using stored authorization information. In such embodiments, the obtaining of authorization for accessing the destination system is based on the access request.

In some embodiments, the computer security method may authenticate the source system based on authentication information included in the source request. In such embodiments, the source request may include the authentication information.

In some embodiments, the computer security method may register with an authorization system prior to receiving the source request, the authorization for accessing the destination system obtained from the authorization system.

In some embodiments, the source request includes the definition of the application programming interface.

Figure 3:
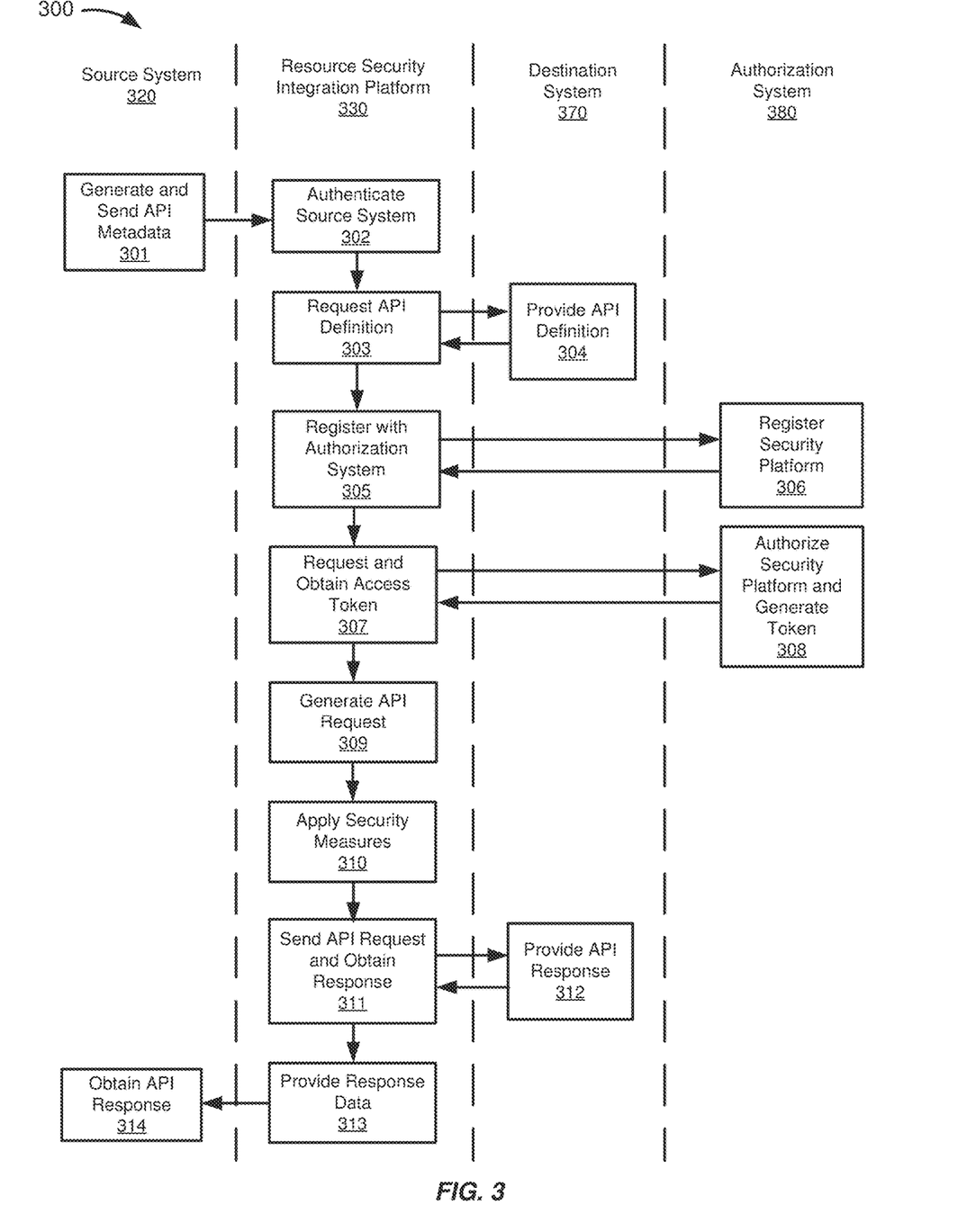
FIG. 3 shows a diagram of a resource security process, according to an embodiment.

FIG. 3 shows a diagram 300 of a resource security process, according to an embodiment. The process includes a source system 320, a resource security integration platform ("security platform") 330, a destination system 370, and an authorization system 380. The security platform 330 of FIG. 3 may be configured similar to the security platform 130 of FIG. 1 described above. The source system 320 of FIG. 3 may be configured similar to the source system 120 of FIG. 1 discussed above. The destination system 370 of FIG. 3 may be configured similar to the destination system 170 of FIG. 1 discussed above. The authorization system 380 of FIG. 3 may be configured similar to the authorization system 180 of FIG. 1 discussed above.

At 301, the source system 320 generates and sends API metadata to the security platform 330. The format and structure of the API metadata is further described below.

At 302, the security platform 330 authenticates the source system using authentication information included along with the API metadata. Authentication may be performed using an x509 certificate or another type of digital certificate, for example. An x509 certificate is a standard digital certificate which helps to identify the user, application, service etc. The certificate may contain a serial number, a version, an algorithm (cryptography algorithm to sign this certificate), a Certificate Authority (CA) name and validity. Using the certificate for authentication helps to prevent data from Man-in-the-Middle (MitM) attack. By using programming language libraries to generate public, private key and sign the digital certificate or application's author can contact CA of his/her organization to issue the digital certificate or by other mechanism.

At 303, the security platform 330 requests API definition information from the destination system 370. This definition information may be formatted as a swagger file. Generally, modern API definitions use swagger files to expose the API method, content type, format, payload template, header information, etc. This definition information may be maintained in a respective application's repository. The security platform 330 may access this file and extract the API definition. For older APIs, the security platform 330 may provide a window for the source system 320 to add the API definition file manually.

At 304 the destination system 370 provides the API definition information to the security platform 330.

At 305, the security platform 330 registers with the authorization system 380. However, in most cases this step may not be performed as the security platform 330 will have previously registered with the authorization system 380 and may not need to re-register. At 306, the authorization system 380 registers the security platform.

At 307, the security platform 330 requests an access token from the authorization system 380. At 308, the authorization system 380 authorizes the security platform and generates the token. Then the security platform 330 obtains the access token from the authorization system 380. The authorization process may be performed by an authorization manager as further described below.

At 309, the security platform 330 generates an API request. The API request is generated by the request builder as further described below.

At 310, the security platform 330 applies security measures. The security measures may be applied using a security tunnel as further described below.

At 311, the security platform 330 sends the API request to the destination system 370. At 312, the destination system 370 provides an API response and then the security platform 330 obtains the API response.

At 313, the security platform 330 provides response data to the source system 320 based on the API response. At 313, the source system 320 obtains the API response. This process is advantageous for the source system 320 as it does not need to register with or authenticate with the authorization system 380 and it only needs to provide the metadata to the security system instead of generating a complete API request.

The functionality of the security platform is further described below with respect to FIG. 4.

Figure 4:
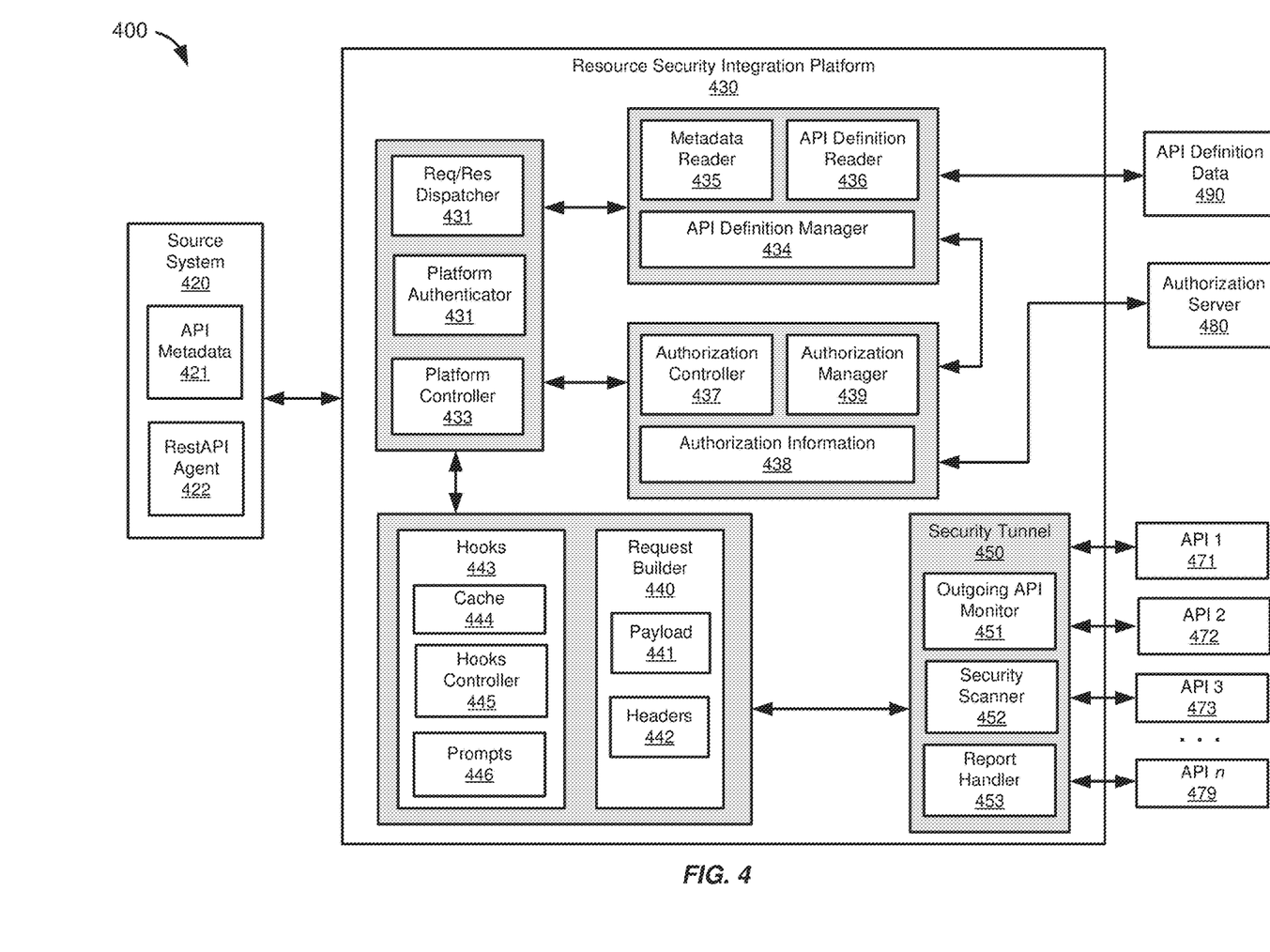
FIG. 4 shows a diagram of components of a resource security integration platform, according to an embodiment.

FIG. 4 shows a diagram 400 of components of a resource security integration platform 430, according to an embodiment. The source system 420 and the security platform 430 may be configured as described above. The API 1 471, API 2 472, and API 3 473 may be configured similar to the destination system described above. The security platform 430 of FIG. 4 may be configured similar to the security platform 130 of FIG. 1 and the security platform 330 of FIG. 3 described above. The source system 420 of FIG. 4 may be configured similar to the source system 320 of FIG. 3 and the source system 120 of FIG. 1 described above. The authorization server 480 of FIG. 4 may be configured similar to the authorization system 380 of FIG. 3 and the authorization system 180 of FIG. 1 described above. The APIs (1-n) 471, 472, 473, 479 may be implemented by a destination system such as the destination system 370 of FIG. 3 or the destination system 170 of FIG. 1.

The security platform 430 may be configured to secure trust with the source system 420 using an application specific authentication module (e.g., oAuth, base64 authentication, etc.). The API metadata file 421 of the source system 420 may a standard JSON file which contains information about target API, headers, requested resource etc. The source system 420 may provide the metadata file 421 to the security platform 430 as discussed above.

An exemplary template of the metadata file is provided below.

```
{
    "interfaces":[{
        "name": "<name of API> [optional]",
        "url": "<API URL>",
        "authType" :"Basic | None | Access Token |SAML | JWT",
        "authorization" : "<Required only for basic auth.
    others filled by Platform> [default: None]",
        "additional-headers" : "<Any additional headers> [optional]",
        "method" : "GET | POST | PUT | DELETE | PATCH",
        "data" : "<Request body. Must be in key value pair json>",
        "hooks" :{
            //Interface json
        }
    }]
}
```

In some embodiments, a RestAPI agent 422 of the source system 420 may be used for establishing the communication between the source application 420 and the security platform 430 (e.g., the agent 422 may access the security platform's restful service endpoint with the metadata file).

The resource security information platform 430 includes a Request/Response dispatcher 431 (Req/Res dispatcher). The Request/Response dispatcher 431 may be configured to handle processing request from source application and pass this detail to controller. In addition, the Request/Response dispatcher 431 may be configured to return the response to the source application of the source system 420.

The resource security information platform 430 includes a controller 433. The controller 433 may read the metadata file 421, execute the authentication mechanism to establish the connection with target API (e.g., API 1-n 471-479), trigger the request builder 440 to build request header/payload and send the request to target API through security tunnel 450. Once this controller 433 receives the response from the target API, it may send the response back to source application of the source system 420 through the dispatcher 431.

The resource security information platform 430 includes an API definition manager 434, a metadata reader 435, and an API definition reader 436. The API definition manager 434 manages the API definitions. Modern API definitions use swagger file to expose the API method, content type, format, payload template, header information, etc. So, these files are maintained in respective application's repository. API definition manager will access this file and extract the API definition. For older APIs, the security platform may provide a window to add the API definition file manually and this is a prerequisite. The metadata reader 435 may be configured to read and interpret the API metadata 421 received from the source system 420. The API definition reader 436 may be configured to retrieve API definition data 490. For example, the API definition data 490 may be a swagger file.

The resource security information platform 430 includes an authentication manager 439. The authentication manager 439 may handle generation of the API request header tat is required to verify the access role of a user. Authentication may be implemented with different types (e.g., basic, oAuth, bearer, etc.) based on the application design and API security model.

Authentication manager 439 may be configured to construct the access token or authorization token by sending the necessary auth calls to an application server, and it may be configured to store the token temporarily. This data may be cleaned up after the successful construction of a request header.

The resource security information platform 430 includes a request builder 440. The request builder 440 may be configured to read data from controller 433. The request builder 440 may construct the payload in a supported format of the target API and it may handle data hierarchies.

The resource security information platform 430 includes hooks 443. The hooks 433 include a cache 444, a hooks controller 445, and prompts 44. The hooks 443 may be configured to create a virtual chain among the APIs as further described below. Using a hook, the outcome of one API can be used as an input to another API. For example, a user may want to get a model definition using modelDefinition API. The input parameter to the modelDefinition API may be 'model id.' In-order to get 'model id,' another API request may need to be triggered. In this example:
1. Send request 'modelIds' API to Application Server
2. Extract 'model id' and construct the payload
3. Send request 'modelDefinition' to Application Server Here, there are two APIs involved to get the model definition as an outcome.

With the use of the security platform 430, the responses from the two APIs may be chained in such a way that the result of the first API will be used to construct the second API request. A sample hooks request is provided below.

```
{
    "interfaces":[{
        "name": "getModelIds",
        "url": https://Host:port/service/model/modelIds",
        "authType" :"OAuth",
        "method" : "GET",
        "hooks" :{
            "name": "<get ModelDefinition",
            "url": "https://Host:port/service/model/modelDefinition",
            "authType" :"OAuth",
```

-continued

```
        "method" : "GET",
      }
    }]
}
```

When application is accessing a third party API (Open source or paid application which is developed outside of organization), it may be required to enforce security measures without compromise. Accordingly, all API requests to the target API may be passed through a security tunnel 450. The security tunnel includes an outgoing API monitor 451, a security scanner 452, and a report handler 453. Each message may be monitored and scanned in order to provide centralized data security.

As such, the resource security integration platform is advantageous because it may handle complex API request communications for one or more source applications using a simplified metadata file, thereby making programming and configuration of the source application easier. In addition, the security platform is advantageous because it enables source applications to authenticate with the single security platform instead of authenticating with numerous API platforms individually. Features and advantages of the security platform further include enabling software developers to design simple metadata requests for use with the security platform instead of generating complete API request messages. Another advantage is that the security platform provides scanning and monitoring of API requests to prevent revealing sensitive data, business/personal contact details, and other private information, such that this monitoring and scanning may not need to be performed by the source applications.

Figure 5:
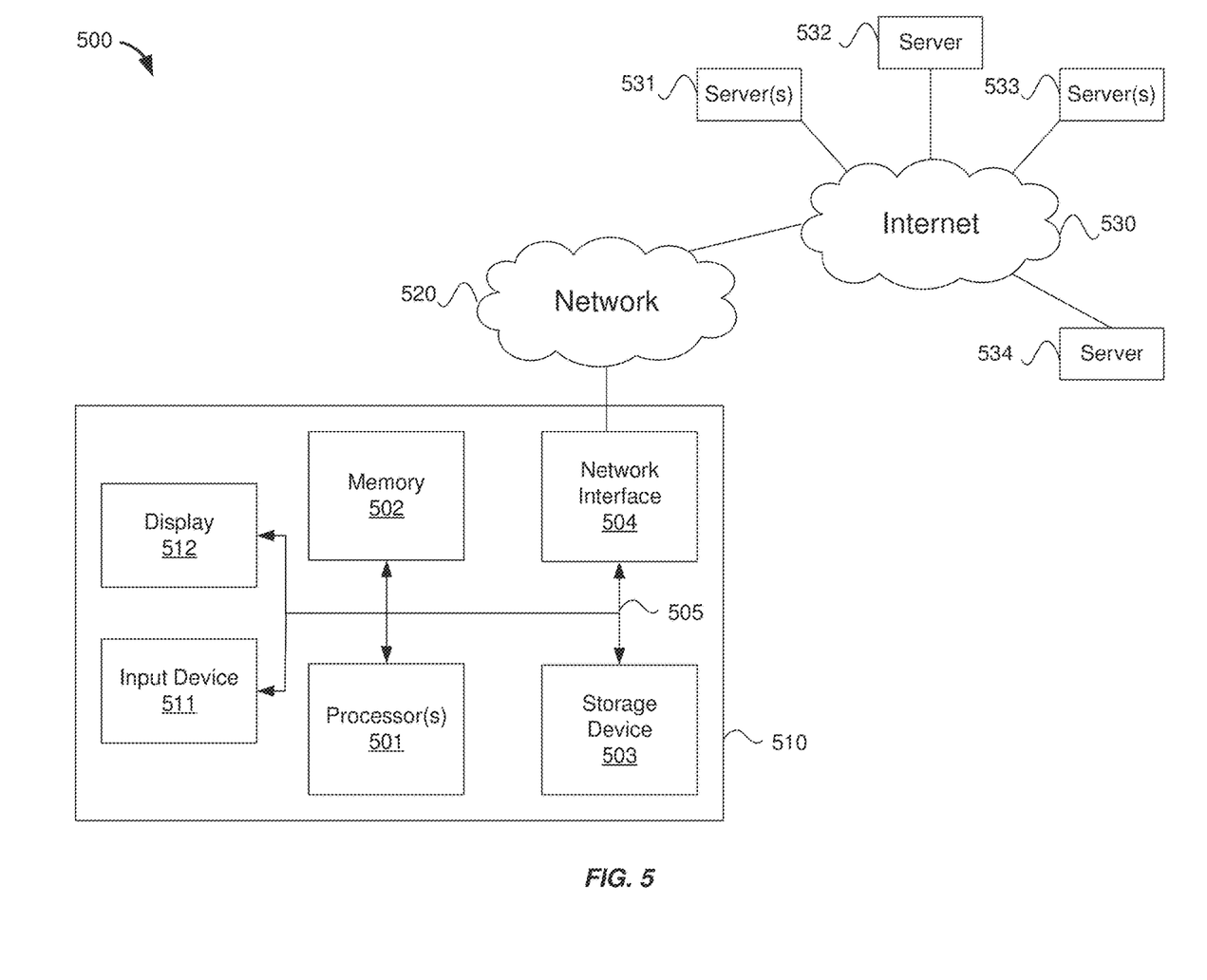
FIG. 5 shows a diagram of hardware of a special purpose computing machine for implementing systems and methods described herein.

FIG. 5 shows a diagram 500 of hardware of a special purpose computing machine for implementing systems and methods described herein. The following hardware description is merely one example. It is to be understood that a variety of computers topologies may be used to implement the above described techniques. The hardware shown in FIG. 5 is specifically configured to implement the resource security integration platform described herein.

A computer system 510 is illustrated in FIG. 5. The computer system 510 includes a bus 505 or other communication mechanism for communicating information, and one or more processor(s) 501 coupled with bus 505 for processing information. The computer system 510 also includes a memory 502 coupled to bus 505 for storing information and instructions to be executed by processor 501, including information and instructions for performing some of the techniques described above, for example. This memory may also be used for storing programs executed by processor(s) 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, such as the method described above with respect to FIG. 2, for example. Storage device and memory are both examples of non-transitory computer readable storage mediums.

The computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

The computer system also includes a network interface 504 coupled with bus 505. The network interface 504 may provide two-way data communication between computer system 610 and a network 520. The network interface 504 may be a wireless or wired connection, for example. The computer system 510 can send and receive information through the network interface 504 across a local area network, an Intranet, a cellular network, or the Internet, for example. In the Internet example, a browser, for example, may access data and features on backend systems that may reside on multiple different hardware servers 531-534 across the network. The servers 531-534 may be part of a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer security system, comprising:
    one or more processors; and
    one or more machine-readable media coupled to the one or more processors and storing computer program code comprising sets of instructions executable by the one or more processors to:
        receive, from a source system, a source request including an indication of a resource and an address of an application programming interface of a destination system;
        obtain a definition of the application programming interface based on the address;
        obtain authorization for accessing the destination system using the definition of the application programming interface;
        generate an interface request message based on the indication of the resource, the address, and the definition of the application programming interface;

send the interface request message to the destination system using the authorization;

receive an interface response message from the destination system; and send response data based on the interface response message to the source system, wherein the indication of the resource is a first indication of a first resource, wherein the address of the application programming interface of the destination system is a first address of a first application programming interface of a first destination system, wherein the source request further includes a second indication of a second resource and a second address of a second application programming interface, wherein the interface response message from the destination system is a first interface response message, wherein the computer program code further comprises sets of instructions executable by the one or more processors to:

generate a second interface request message based on the first interface response message, the second indication of the second resource, and the second address; and obtain a second interface response message based on the second interface request message, wherein the response data sent to the source system is further based on the second interface response message.

2. The computer security system of claim 1, wherein the computer program code further comprises sets of instructions executable by the one or more processors to:

scan the interface request message based on one or more security policies.

3. The computer security system of claim 1, wherein the computer program code further comprises sets of instructions executable by the one or more processors to:

send an access request to an authorization server using stored authorization information, wherein the obtaining of authorization for accessing the destination system is based on the access request.

4. The computer security system of claim 1, wherein the source request includes authentication information, wherein the computer program code further comprises sets of instructions executable by the one or more processors to:

authenticate the source system based on the authentication information included in the source request.

5. The computer security system of claim 1, wherein the computer program code further comprises sets of instructions executable by the one or more processors to:

register with an authorization system prior to receiving the source request, the authorization for accessing the destination system obtained from the authorization system.

6. The computer security system of claim 1, wherein the source request includes the definition of the application programming interface.

7. The computer security system of claim 1, wherein each interface request message is passed through one or more security tunnels.

8. One or more non-transitory computer-readable media storing computer program code executable by one or more processors, the computer program code comprising sets of instructions to:

receive, from a source system, a source request including an indication of a resource and an address of an application programming interface of a destination system;

obtain a definition of the application programming interface based on the address;

obtain authorization for accessing the destination system using the definition of the application programming interface;

generate an interface request message based on the indication of the resource, the address, and the definition of the application programming interface;

send the interface request message to the destination system using the authorization;

receive an interface response message from the destination system; and send response data based on the interface response message to the source system, wherein the indication of the resource is a first indication of a first resource, wherein the address of the application programming interface of the destination system is a first address of a first application programming interface of a first destination system, wherein the source request further includes a second indication of a second resource and a second address of a second application programming interface, wherein the interface response message from the destination system is a first interface response message, wherein the computer program code further comprises sets of instructions executable by the one or more processors to:

generate a second interface request message based on the first interface response message, the second indication of the second resource, and the second address; and obtain a second interface response message based on the second interface request message, wherein the response data sent to the source system is further based on the second interface response message.

9. The non-transitory computer-readable media of claim 8, wherein the computer program code further comprises sets of instructions executable by the one or more processors to:

scan the interface request message based on one or more security policies.

10. The non-transitory computer-readable media of claim 8, wherein the computer program code further comprises sets of instructions executable by the one or more processors to:

send an access request to an authorization server using stored authorization information, wherein the obtaining of authorization for accessing the destination system is based on the access request.

11. The non-transitory computer-readable media of claim 8, wherein the source request includes authentication information, wherein the computer program code further comprises sets of instructions executable by the one or more processors to:

authenticate the source system based on the authentication information included in the source request.

12. The non-transitory computer-readable media of claim 8, wherein the computer program code further comprises sets of instructions executable by the one or more processors to:

register with an authorization system prior to receiving the source request, the authorization for accessing the destination system obtained from the authorization system.

13. The non-transitory computer-readable media of claim 8, wherein the source request includes the definition of the application programming interface.

14. The non-transitory computer-readable media of claim 8, wherein each interface request message is passed through one or more security tunnels.

15. A computer-implemented method, comprising:
- receiving, from a source system, a source request including an indication of a resource and an address of an application programming interface of a destination system;
- obtaining a definition of the application programming interface based on the address;
- obtaining authorization for accessing the destination system using the definition of the application programming interface;
- generating an interface request message based on the indication of the resource, the address, and the definition of the application programming interface;
- sending the interface request message to the destination system using the authorization;
- receiving an interface response message from the destination system; and
- sending response data based on the interface response message to the source system, wherein the indication of the resource is a first indication of a first resource, wherein the address of the application programming interface of the destination system is a first address of a first application programming interface of a first destination system, wherein the source request further includes a second indication of a second resource and a second address of a second application programming interface, wherein the interface response message from the destination system is a first interface response message, wherein the method further comprises:
  - generating a second interface request message based on the first interface response message, the second indication of the second resource, and the second address; and
  - obtaining a second interface response message based on the second interface request message, wherein the response data sent to the source system is further based on the second interface response message.

16. The computer-implemented method of claim 15, further comprising:
- scanning the interface request message based on one or more security policies.

17. The computer-implemented method of claim 15, further comprising:
- sending an access request to an authorization server using stored authorization information, wherein the obtaining of authorization for accessing the destination system is based on the access request.

18. The computer-implemented method of claim 15, further comprising:
- authenticating the source system based on authentication information included in the source request.

19. The computer-implemented method of claim 15, further comprising:
- registering with an authorization system prior to receiving the source request, the authorization for accessing the destination system obtained from the authorization system.

20. The computer-implemented method of claim 15, wherein each interface request message is passed through one or more security tunnels.

* * * * *